United States Patent
Chen et al.

(10) Patent No.: US 10,364,079 B2
(45) Date of Patent: Jul. 30, 2019

(54) INTEGRAL HOT MELT ADHESIVE PACKAGING FILMS AND USE THEREOF

(71) Applicant: HENKEL IP & HOLDING GMBH, Duesseldorf (DE)

(72) Inventors: Jinyu Chen, Fanwood, NJ (US); Yuhong Hu, Belle Mead, NJ (US); Darshak Desai, Edison, NJ (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 734 days.

(21) Appl. No.: 15/004,187

(22) Filed: Jan. 22, 2016

(65) Prior Publication Data

US 2016/0137371 A1 May 19, 2016

Related U.S. Application Data

(62) Division of application No. 13/800,445, filed on Mar. 13, 2013, now Pat. No. 9,272,795.

(Continued)

(51) Int. Cl.
*B65D 65/38* (2006.01)
*B65B 1/04* (2006.01)
(Continued)

(52) U.S. Cl.
CPC ............... *B65D 65/38* (2013.01); *B32B 1/02* (2013.01); *B32B 27/08* (2013.01); *B32B 27/20* (2013.01); *B32B 27/32* (2013.01); *B32B 27/327* (2013.01); *B65B 1/04* (2013.01); *B65B 63/08* (2013.01); *C08J 5/18* (2013.01); *C08L 23/0807* (2013.01);
(Continued)

(58) Field of Classification Search
CPC ..... B65B 2220/24; B65B 63/08; B65D 65/38; C08L 23/12; C08L 23/20; C08L 2203/16; C08L 2205/02; C08L 2205/025
USPC ............... 53/440, 450; 428/35.7, 35.2, 516; 525/240, 98; 526/348.6, 351, 352
See application file for complete search history.

(56) References Cited

U.S. PATENT DOCUMENTS 3,723,035 A * 3/1973 Franke ................... B65B 63/08
264/148
4,054,632 A * 10/1977 Franke ................... B65B 63/08
264/145

(Continued)

FOREIGN PATENT DOCUMENTS

CN 1695917 A 11/2005
CN 1906264 A 1/2007
(Continued)

OTHER PUBLICATIONS

Eastotac Hydrocarbon Resins Brochure by the Eastman Company (Aug. 1992).
(Continued)

*Primary Examiner* — Hemant Desai
*Assistant Examiner* — Valentin Neacsu
(74) *Attorney, Agent, or Firm* — Sun Hee Lehmann

(57) ABSTRACT

Propylene polymer based packaging films for encapsulating hot melt adhesives are disclosed. The packaging films are readily miscible with the various hot melt adhesive chemistries during the melting stage without deleteriously affecting the adhesive properties, making the packaging film particularly well suited for packaging hot melt adhesives in a pillow, cylinder, pouch, block, cartridge and like forms.

3 Claims, 1 Drawing Sheet

Related U.S. Application Data

(60) Provisional application No. 61/648,290, filed on May 17, 2012.

(51) Int. Cl.

| | | |
|---|---|---|
| *B32B 1/02* | (2006.01) | |
| *C08L 23/12* | (2006.01) | |
| *C08L 23/08* | (2006.01) | |
| *C09J 123/14* | (2006.01) | |
| *B32B 27/08* | (2006.01) | |
| *B32B 27/20* | (2006.01) | |
| *B32B 27/32* | (2006.01) | |
| *B65B 63/08* | (2006.01) | |
| *C08J 5/18* | (2006.01) | |
| *B65B 9/20* | (2012.01) | |

(52) U.S. Cl.
CPC ............ *C08L 23/0815* (2013.01); *C08L 23/12* (2013.01); *C09J 123/14* (2013.01); *B32B 2270/00* (2013.01); *B32B 2553/00* (2013.01); *B65B 9/20* (2013.01); *B65B 2220/24* (2013.01); *C08J 2323/08* (2013.01); *C08J 2323/12* (2013.01); *C08J 2423/08* (2013.01); *C08J 2423/12* (2013.01); *C08L 2203/16* (2013.01); *C08L 2203/162* (2013.01); *C08L 2205/02* (2013.01); *C08L 2314/06* (2013.01); *Y10T 428/1345* (2015.01); *Y10T 428/1352* (2015.01); *Y10T 428/1397* (2015.01)

(56) References Cited

U.S. PATENT DOCUMENTS

| | | | |
|---|---|---|---|
| 4,233,432 A | 11/1980 | Curtis, Jr. | |
| 5,041,251 A | 8/1991 | McCoskey et al. | |
| 5,171,628 A | 12/1992 | Arvedson et al. | |
| 5,256,717 A | 10/1993 | Stauffer et al. | |
| 5,257,491 A * | 11/1993 | Rouyer | B29B 13/022 206/447 |
| 5,331,033 A | 7/1994 | Stauffer et al. | |
| 5,333,439 A * | 8/1994 | Bozich | B65B 33/00 206/447 |
| 5,373,682 A * | 12/1994 | Hatfield | B29B 13/022 206/524.7 |
| 5,392,592 A * | 2/1995 | Bozich | B65B 33/00 206/447 |
| 5,397,843 A | 3/1995 | Lakshmanan et al. | |
| 5,462,807 A | 10/1995 | Halle et al. | |
| 5,468,440 A | 11/1995 | McAlpin et al. | |
| 5,529,843 A | 6/1996 | Dries et al. | |
| 5,669,207 A * | 9/1997 | Hull | B65B 63/08 53/127 |
| 5,725,820 A * | 3/1998 | Reynolds | B29C 31/044 264/135 |
| 5,819,505 A * | 10/1998 | Fayolle | B05D 5/08 53/440 |
| 5,848,696 A * | 12/1998 | Christ | B65B 9/067 206/447 |
| 5,865,927 A * | 2/1999 | Puletti | B01J 2/003 156/244.11 |
| RE36,177 E * | 4/1999 | Rouyer | B29B 13/022 206/447 |
| 5,902,684 A | 5/1999 | Bullard et al. | |
| 6,006,497 A * | 12/1999 | Waver | B65D 75/002 264/264 |
| 6,096,831 A * | 8/2000 | Nagaoka | C08L 23/10 428/316.6 |
| 6,138,441 A * | 10/2000 | Kik | B65B 9/12 206/524.7 |
| 6,155,029 A * | 12/2000 | Jain | B65B 9/067 53/122 |
| 6,294,249 B1 | 9/2001 | Hamer et al. | |
| 6,430,898 B1 * | 8/2002 | Remmers | B29B 13/022 53/140 |
| 6,773,818 B2 | 8/2004 | Cretekos et al. | |
| 6,833,404 B2 | 12/2004 | Quinn et al. | |
| 6,933,531 B1 * | 8/2005 | Ishikawa | B22F 3/14 257/76 |
| 7,137,235 B2 * | 11/2006 | Burriez | B65B 63/08 53/450 |
| 7,232,535 B1 * | 6/2007 | Somers | B29C 47/06 264/148 |
| 7,326,042 B2 * | 2/2008 | Alper | B65B 63/08 425/127 |
| 7,328,547 B2 * | 2/2008 | Mehta | B65B 63/08 428/35.7 |
| 7,350,644 B2 * | 4/2008 | Harwell | B65B 63/08 206/447 |
| 8,043,675 B2 * | 10/2011 | Davison | C09J 123/22 428/35.7 |
| 2003/0155261 A1 * | 8/2003 | Paul | B29B 13/022 206/447 |
| 2004/0074800 A1 * | 4/2004 | Harwell | B65B 63/08 206/484 |
| 2004/0119198 A1 * | 6/2004 | Alper | B65B 63/08 264/237 |
| 2006/0075723 A1 * | 4/2006 | Burriez | B65B 63/08 53/435 |
| 2006/0093764 A1 * | 5/2006 | Mehta | B65B 63/08 428/35.2 |
| 2008/0118689 A1 * | 5/2008 | Mehta | B65B 63/08 428/35.7 |
| 2008/0132625 A1 * | 6/2008 | Niehaus | C08K 5/0008 524/285 |
| 2008/0268271 A1 * | 10/2008 | Burriez | B65B 63/08 428/523 |
| 2010/0124607 A1 | 5/2010 | Berti et al. | |
| 2011/0247304 A1 * | 10/2011 | Kaldenhoff | B65B 63/08 53/428 |
| 2011/0311742 A1 * | 12/2011 | Kadowaki | B65D 85/808 428/35.2 |

FOREIGN PATENT DOCUMENTS

| | | |
|---|---|---|
| CN | 102275659 A | 12/2011 |
| EP | 0557573 A2 | 9/1993 |
| JP | 2004518789 A | 6/2004 |
| JP | 2010247386 A | 11/2010 |
| WO | 9413451 A1 | 6/1994 |
| WO | 9607522 A1 | 3/1996 |
| WO | 9709393 A1 | 3/1997 |
| WO | 0146019 A1 | 6/2001 |

OTHER PUBLICATIONS

Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (Technomic Publishing Company, Inc., 1989) p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.

(56) References Cited

OTHER PUBLICATIONS

Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

* cited by examiner

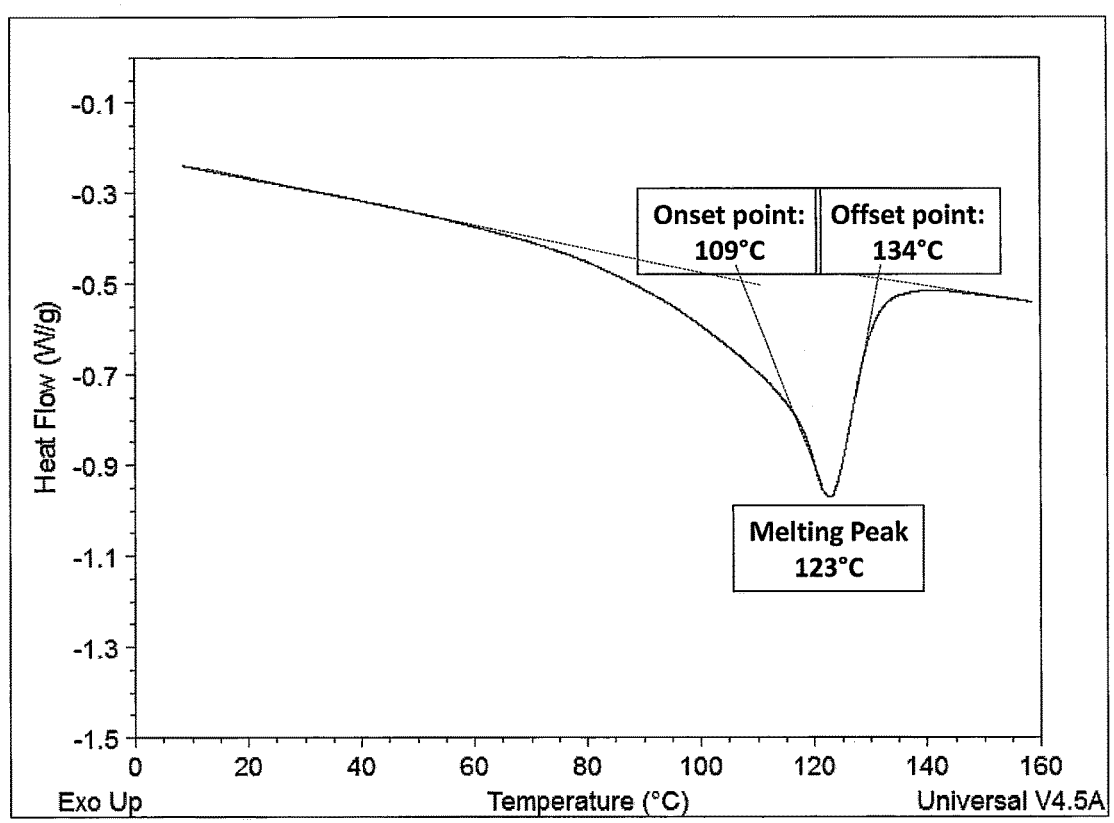

INTEGRAL HOT MELT ADHESIVE PACKAGING FILMS AND USE THEREOF

FIELD OF THE INVENTION

The present invention relates to packaging films for encapsulating hot melt adhesives. The packaging films are readily miscible with the hot melt adhesive during the adhesive melting stage without deleteriously affecting the adhesive properties, making the packaging film particularly well suited for packaging hot melt adhesives in a pillow, cylinder, pouch, block, cartridge and the like.

BACKGROUND OF THE INVENTION

Hot melt adhesives are solid at room temperature while generally being applied in the molten or liquid state. Typically, these adhesives are provided in the form of blocks and because of their tacky nature, the solid adhesive blocks not only stick to each other or adhere to mechanical handling devices, but also pick up dirt and other contaminants during transport. Additionally, certain applications that require high tack formulations result in blocks that will deform or cold flow unless supported during shipment.

Various methods of packaging hot melt adhesives have been developed to address the above concerns. In one method, non-tacky powders are applied onto the hot melt adhesives, and the contents are bagged in packaging films. In some applications, the packaging films must be removed before melting the hot melt adhesives. In other methods, and as taught in U.S. Pat. Nos. 5,373,682 and 7,350,644, the packaging film is a part of the hot melt adhesive, and the packaging film is dissolved with the adhesive during the melting stage. While these films may not deleteriously affect the adhesive properties, for they are in minor quantities (typically less than 5 wt % of the total weight), the films may not readily blend into the molten hot melt adhesives during the heating and application stage. The immiscible portion of the packaging film separates from the hot melt adhesive as a distinct and separate layer by floating on the surface of the melt and/or adhering to the walls of the melt tank, and over time, can cause mechanical problems for the adhesive melt tanks. Because there are numerous types of hot melt adhesives based on various chemistries, the packaging films must be selected to ensure good miscibility with the chosen hot melt adhesive.

There continues to be a need in the art for hot melt adhesive packaging films that allows for wider applicability of hot melt adhesives. The current invention fulfills this need.

BRIEF SUMMARY OF THE INVENTION

The invention provides integral packaging films for various hot melt adhesives. Removal of the integral packaging film is not necessary because the integral packaging film is readily miscible with the hot melt adhesive during the adhesive melting stage without negatively affecting the adhesive properties.

Applicants have discovered that a specific combination of packaging film's chemistry, melt viscosity, melt strength, peak melt temperature, offset melt temperature, and storage modulus are critical in forming a chemically compatible, miscible, film in the integral hot melt adhesive package that is suitable for various hot melt adhesive chemistries.

In one embodiment, the integral packaging film comprises a polymer blend, comprising at least 70 wt % of propylene content; and the packaging film has (a) a viscosity range of about 200,000 to 3,000,000 cps at 200° C.; (b) a melting peak temperature range of about 90 to 140° C. (c) a Tm offset temperature below 149° C.; and (d) a storage modulus (G') at 100° C. of about $1 \times 10^6$ to $1 \times 10^8$ Pascal.

Another embodiment is directed to an article that is a hot melt adhesive encapsulated by an integral packaging film. The integral packaging film is completely miscible in the hot melt adhesive without any agitation at 149° C. or higher when the packaging film is present up to 2% of the total weight of the article. The hot melt adhesive comprises poly-alpha-olefins, rubbers, styrenic block-copolymers, ethylene-vinyl acetates, ethylene-butyl acetates, and/or mixtures thereof. The integral packaging film comprises a polymer blend, comprising at least 70 wt % of propylene content; and the packaging film has (a) a viscosity range of about 200,000 to 3,000,000 cps at 200° C.; (b) a melting peak temperature range of about 90 to 140° C. (c) a Tm offset temperature below 149° C.; and (d) a storage modulus (G') at 100° C. of about $1 \times 10^6$ to $1 \times 10^8$ Pascal.

Yet another embodiment is directed to the method of packaging a hot melt adhesive with the packaging film to form an integral hot melt adhesive package. The process comprises the step of: (1) preparing the integral packaging film as an encapsulating vessel; (2) pumping or pouring the hot melt adhesive in a molten state into the integral packaging film, and the integral packaging film is in direct contact with a heat sink; (3) sealing the integral packaging film; and (4) cooling the sealed package. The integral packaging film comprises a polymer blend comprising (a) from about 70 to about 99 wt % of propylene content and (b) from about 1 to about 30 wt % of butene and/or ethylene content. The integral hot melt adhesive package is a sealed, non-tacky package that resists dirt and other contaminant during transport.

BRIEF DESCRIPTION OF THE DRAWING

FIG. 1 is a DSC scan of Sample 4, showing peak melting point, Tm onset and Tm offset values.

DETAILED DESCRIPTION OF THE INVENTION

The term "olefin hot melt adhesive" is used herein generically to refer to all polyolefin based hot melt adhesives, including but not limiting to hot melt adhesives made from amorphous olefin, polyethylene, polypropylene, polybutene and their copolymers.

The terms "wrapped," "encapsulated" and "packaged" are used interchangeable herein and mean that blocks of hot melt adhesives are encased within a layer of film. The film is a tackless or non-blocking layer and further serves to protect the adhesive from contamination, serves to allow easy shipping and handling.

The term "integral package film" is used herein as package film that surrounds blocks of hot melt adhesive and can be processed (melted and applied onto substrates) without the removal of the film during the heating and application of the adhesive. Similar to packaged films, the integral package film is also non-blocking and protects the adhesives from contaminations.

The integral packaging film comprises a polymer blend. The polymer blend comprises at least two thermoplastic polymers, and the blend has a propylene content of at least about 70 wt %, and up to about 99 wt %, based on the total weight of the polymer blend. Examples of propylene rich copolymers are LMPP 400 and LMPP 600 from Idemitsu Kosan Co., Ltd; Linxar 127, Vistamaxx 6202, Vistamaxx 6102, Vistamaxx 3980, Vistamaxx 3020, Vistamaxx 3000 from ExxonMobile Corp; and the like.

In one embodiment, the other thermoplastic polymer(s) is a butene and/or ethylene comonomers. The other thermoplastic polymers may account from about 1 wt % to about 30 wt %, based on the total weight of the polymer blend. Ethylenes may be accountable up to 15 wt %, preferably below 10 wt %, based on the total weight of the polymer blend. Suitable commercial butene rich polymers include Vestoplast 308, Vestoplast 408, Vestoplast 508, Vestoplast 520, Vestoplast 608, Vestoplast 703 from Evonik Industries, and the like. Suitable commercial ethylene rich polymers include Affinity GA1950 from Dow Chemicals, and the like.

At least one thermoplastic polymer is a metallocene catalyzed polymer. Suitable polymers include metallocene catalyzed polyethylenes, ethylene-butene and ethylene-octane elastomers, plastomers, propylene-butene, propylene-ethylene copolymers.

The films may, if desired, contain antioxidants for enhanced stability as well as other optional components including slip agents such as erucamide, anti-blocking agents such as diatomaceous earth, fatty amides or other processing aids, anti-stats, stabilizers, plasticizers, dyes, perfumes, fillers such as talc or calcium carbonate and the like.

The polymer blends may be blended by any means known in the art. In one embodiment, the polymer blend is processed in a twin screw extruder for mixing and melting. The melted blend is then cast to a film by any means known in the art. The thickness of the film will generally vary from about 0.5 mil to about 5 mil, preferably from about 1 mil to about 3 mil. The thickness of the particular film also varies depending upon the composition and application temperature. The film may be a monolayer or multi-layered film.

It has been discovered that the packaging film must have a specific combination of properties in order to form an integral hot melt adhesive package that is chemically compatible with various hot melt adhesive chemistries while maintaining integrity as a packaging film for the hot melt adhesives. Such packaging film requires (a) a viscosity range of about 200,000 to 3,000,000 cps at 200° C.; (b) a peak melting temperature (Tm) range of about 90 to 140° C. (c) a melting temperature (Tm) offset temperature below 149° C.; and (d) a storage modulus (G') range of about $1 \times 10^6$ to about $1 \times 10^8$ Pascal at 100° C.

The peak melting points and offset can be determined by various methods known in the art. The reported peak melting points and Tm offset values reported herein were determined with a DSC (differential scanning calorimetry). Unless otherwise stated, about 5 mg of the film sample was sealed in a crimped alumina pan, cooled the sample to −40° C., and reheated it to 180° C. at a rate of 10° C./min with 2920 DSC TA Instruments. The endothermic melting peak on the second heat up cycle was used to evaluate the peak melting point and heat of fusion, and the end of melting peak was the Tm offset temperature.

The packaging film must encompass all of the above properties in order to form a packaging film, maintain integrity of the film while encapsulating a molten adhesive, result in a non-tacky barrier seal for the molten adhesive and dissolve completely in with the hot melt adhesive upon melting without any agitation. The packaging film is non-blocking at elevated temperatures, temperatures that simulate box car conditions (35-45° C.). The packaging film melts at temperatures above about 149° C. without any agitation or additional energy within 5 hours. The packaging film is meltable together with various and multiple hot melt adhesives and is blendable into the molten hot melt adhesives without deleteriously affecting the properties of the adhesive.

Another embodiment is directed to an article comprising a hot melt adhesive encased with a packing film. The article is an integral hot melt adhesive package formed as a pillow, cylinder, pouch, block, cartridge or chub.

The hot melt adhesive of the integral hot melt adhesive package comprises various thermoplastic polymers. The hot melt adhesives are mainly composed of polymers that include poly-alpha-olefins, rubbers, styrenic block-copolymers, ethylene-vinyl acetates, ethylene-butyl acetates, and/or mixtures thereof. The hot melt adhesives may optionally comprise tackifiers, plasticizer, oils, waxes, and additives.

In one embodiment, the packaging film comprise up to about 2% by weight of the integral hot melt adhesive package, and preferably from about 0.1 to about 1.5%, in order to prevent undue dilution of the adhesive properties. Typically, each packing film has a thickness range of from about 0.5 mil to about 5 mil, preferably from about 1 mil to about 3 mil.

The packaging film of the integral hot melt adhesive package is miscible in various hot melt adhesives without any portions of the film separating from the molten hot melt adhesive by floating on the surface of the hot melt or adhering to the walls of the melt tank.

Typically to form a miscible, chemically compatible and non-separating adhesive, the packaging film is chosen based on the predominant polymer used in the hot melt adhesive. Failure to pick a compatible hot melt adhesive and packaging film results in portions of the films floating on the surface of the hot melt or adhering to the walls of the melt tank. It has been discovered that the instant packaging film is miscible with multiple hot melt adhesive chemistries, e.g., polyolefins, rubbers, ethylene-vinyl acetate copolymers, polyamides, polyesters, polyurethanes, and the like, while forming a non-tacky outer protection.

To package a hot melt adhesive with the packaging film, the hot melt adhesive is melted and pumped or poured into a cylindrical thermoplastic film, where the cylindrical tube being in direct contact with a heat sink, e.g., cooled water or a cooled liquid or gaseous environment. Wrapping and sealing the film can occur either manually or, more preferably, by an automated procedure. The hot melt adhesive being poured or pumped is at a temperature at or above the melting point of the packaging film and the interior of the packaging film becomes melted together with the molten hot melt adhesive and blended into the molten adhesive without deleteriously affecting the properties of the adhesive. The molten hot melt adhesive filled cylinder is sealed and allowed to solidify. Optionally, air is removed with a vacuum during the sealing process, and as a result no gap exists between the film and the hot melt adhesive. The resultant individually integral hot melt adhesive packages can be stored, handled and used without the individual packages sticking together, adhering to other objects, or becoming contaminated even if exposed to increased pressure and/or temperature.

To ultimately utilize the integral hot melt adhesive packages as an adhesive, the package is placed to the melt tank, without removing the film. The strong interface or interphase, between the hot melt adhesive and integral packaging film, requires very little additional energy to melt and blend the film into the adhesive itself.

EXAMPLES

Example 1

Samples 1-7 were formed as packaging film. The propylene (PP) and butene/ethylene comonomer contents are listed in Table 1. Viscosity was measured at 200° C. with a rheometer with near-zero shear. The films were formed by melting the polymer components through a twin-screw extruder, and then casting it on a cold roll at a thickness of 1.5 mil. The miscibility of the film was evaluated by melting approximately 10,000 grams of an amorphous poly alpha-olefin adhesive (DISPOMELT® LITE 300 from Henkel Corporation) in a melt tank with about 0.5 wt % (based on the adhesive) of the film sample at 160° C. The length of time that it took for the film sample to melt into the adhesive, without any agitation, was recorded. For Sample 8, EVA film with 3% VA content blow film was also employed for this study.

The storage modulus (G') of the film at 100° C. was measured by a Rheometric Dynamic Analyzer (RDA III) and TA Orchestrator software version 7.2.0.2. The adhesive sample is loaded into parallel plates 7.9 mm in diameter and separated by a gap of about 2 mm. The sample was then cooled to about −30° C., and the time program was started. The program test increased the temperature at 5° C. intervals followed by a soak time at each temperature of 10 seconds. The convection oven containing the sample was flushed continuously with nitrogen. The frequency is maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 30%. The autostrain program adjusted the strain at each temperature increment. The shear storage or elastic modulus (G') was calculated by the software from the torque and strain data.

The film strength of the film sample was evaluated by encapsulating a molten DISPOMELT® LITE Lite 300 with

TABLE 1

Polymer blend.

| Film Sample | Propylen (%) | Butene/Ethylene Comonomer (%) | Viscosity (cps at 200° C.) | MFR (ref.) g/10 min @ 230° C. | Film Feasibility | Film Miscibility |
|---|---|---|---|---|---|---|
| 1 | 36.4 | 63.4 | 45,000 | N/A | Difficult | N/A |
| 2 | 73.2 | 26.8 | 1,000,000 | N/A | good | ≤3 h |
| 3 | 91.5 | 8.5 | 3,000,000 | 8.3 | good | ≤3 h |
| 4 | 97 | 3 | 1,800,000 | 12 | good | ≤3 h |
| 5 | 97 | 3 | 680,000 | 30 | good | ≤3 h |
| 6 | 97 | 3 | 810,000 | N/A | good | ≤3 h |
| 7 | Non-metallocene-(PP) based polymer (~97% PP and 3% comonomer) | | 2,200,000 | 12 | good | >5 h |
| 8 | EVA with 3% VA | | 5,000,000 | 2.3 | good | >24 h |

N/A—not available

Film sample 1, with a low melt viscosity, less than 200,000 at 200° C., could not be converted to a film. All other samples, Film Samples 2-8, were cast as films.

Film samples 2-6 were melted into DISPOMELT® LITE 300, and became a homogeneous mass in less than three hours. Film sample 7 also became homogenous mass, but the non-metallocene based polypropylene copolymer film took greater than five hours to become miscible with the amorphous poly-alpha-olefin type hot melt adhesive. EVA film, Film Sample 8, took more than 24 hours to melt into the adhesive. Moreover, the EVA film gelled and formed hard clusters, and some of the hard clusters floated on the hot melt tank surfaces. Such hard clusters are undesirable for they tend to block the spray or slot nozzles.

Example 2

The melting temperature and melt modulus of the sample films were characterized to assess their melt strength, and the results are shown in Table 2. Melting points were determined with a 2920 DSC (differential scanning calorimetry) TA Instruments. About 5-10 mg of a sample was sealed in a crimped alumina pan, cooled to −40° C., and reheated it to 180° C. at a rate of 10° C./min with 2920 DSC TA Instruments. The second heat up cycle was used to evaluate the peak melting point and Tm offset values.

the film samples to form a package. The quality and the strength of the package after cooling were visually evaluated. If the film sample maintained the integrity and formed an encasement of the hot melt adhesive, the film was given a rating of "strong." If any holes or the hot melt adhesive destroyed the integrity of the film sample, then a rating of "weak" was given to the film.

TABLE 2

Melt strength of films and their application in hot melt capsulation

| | Melt Strength | | |
|---|---|---|---|
| Film Sample | Tm Peak (° C.) | G' at 100° C. (Pascal) | Film strength |
| 1 | 104 | $1.0 \times 10^4$ | Weak |
| 2 | 82 | $4.5 \times 10^4$ | Weak |
| 3 | 80 | $7.0 \times 10^4$ | Weak |
| 8 | 106 | $2.0 \times 10^6$ | Strong |
| 4 | 123 | $6.0 \times 10^6$ | Strong |
| 5 | 138 | $1.55 \times 10^7$ | Strong |
| 6 | 123 | $8.0 \times 10^6$ | Strong |
| 7 | 147 | $2.5 \times 10^8$ | Strong |
| 8 | 106 | $2 \times 10^6$ | Strong |

Samples 1-3 burst during the filling process, resulting in unacceptable packages. Sample 4-8 was strong enough to form acceptable packages without any bursts in the sample film. It was discovered that peak Tm ranges of about 90 to 140° C. and a storage modulus of about $1 \times 10^6$ to about $1 \times 10^8$ Pascal at 100° C. allowed the films to withstand the filling process and result in acceptable quality of packages.

Example 3

Samples 4-8 were tested for their sprayability. About 10,000 g sample of DISPOMELT LITE® Lite 300 adhesive was encapsulated with a sample film having a thickness of about 1.5 mil. The package was loaded into a hot melt tank set for 160° C. for three hours for samples 4-6 (ten hours for sample 7, and 24 hours for sample 8). The molten adhesive was then sprayed through a four-port ITW spray head (Nordson) and the number of stray globs/minute was recorded in Table 3. The Tm offset of each of the sample film are also recorded in Table 3.

TABLE 3

Film/adhesive package's meltdown and sprayability

| Film Sample | Stray Sprayability (with DISPOMELT ® LITE 300) | Tm offset (° C.) |
| --- | --- | --- |
| 4 | 2 globs/min | 134 |
| 5 | 2 globs/min | 144 |
| 6 | 2 globs/min | 144 |
| 7 | >10 globs/min | 158 |
| 8 | >400 globs/min | 115 |

Sample 7 had greater than 10 stray globs/minute. In contrast, samples 4-6 had only two stray globs/minute. Unlike sample 7, samples 4-6 have Tm offset values lower than 149° C. It was discovered that packaging films having Tm offset value below 149° C. is an important factor to minimize strays in sprayability. While Sample 8 also has a Tm Offset value less than 149° C., immiscibility of the EVA film with the encapsulated adhesive is a limitation resulting in increased strays.

Example 4

Hot melt adhesive packages with various hot melt adhesives (1,000 g) and packaging film (0.5 wt % based on the hot melt adhesive) were formed and are listed in Table 4. Each package was loaded into a hot melt tank and heated at the listed temperature without any agitation. The miscibility of the film in the hot melt adhesives was visually observed. Also, the length of time required to fully dissolve the film sample and become miscible in the adhesive was noted.

TABLE 4

Film Miscibility with Various Hot Melt Adhesive

| Hot Melt Adhesive (polymer type) | Film | Testing Temperature | Miscibility Observation |
| --- | --- | --- | --- |
| DISPOMELT LITE 300 from Henkel Corporation (Amorphous poly-alpha olefin adhesive) | Film sample 5 | 160° C. | Completely Miscible in less than 3 hours |
| DISPOMELT 901B from Henkel Corporation (Styrenic block copolymer based adhesive | Film sample 5 | 160° C. | Completely Miscible in less than 3 hours |

As observed above, the packaging film (1) made with a polypropylene copolymer that comprises at least 70 wt % propylene content; (2) has a viscosity range of about 200,000 to 3,000,000 cps at 200° C.; (3) has a melting peak temperature range of about 90 to 140° C., (4) has an Tm offset temperature below 149° C.; (5) has a storage modulus (G') at 100° C. of about $1 \times 10^6$ to $1 \times 10^8$ Pascal, is miscible with various and multiple hot melt adhesives formed from various polymers, and may be used as a universal packaging adhesive for integral hot melt adhesive packages.

We claim:

1. A method of forming a cylindrical integral hot melt adhesive package comprising the steps of:
   1. preparing packaging film as an encapsulating vessel;
   2. pumping or pouring the hot melt adhesive in a molten state into the packaging film, wherein the packaging film is in direct contact with a heat sink;
   3. sealing the packaging film; and
   4. cooling the sealed package; and
   wherein the packaging film comprises a polymer blend comprising at least 70 wt % of propylene and up to 15 wt % of ethylene content; and the packaging film has (a) a viscosity range of about 200,000 to 3,000,000 cps at 200° C. with a rheometer with near-zero shear; (b) a peak melting temperature range of about 90 to 140° C.; (c) a Tm offset temperature below 149° C.; and (d) a storage modulus (G') range of about $1 \times 10^6$ to about $1 \times 10^8$ Pascal at 100° C. with frequency at 10 rad/s;
   wherein the hot melt adhesive selected is from the group consisting of poly-alpha-olefins, rubbers, styrenic block-copolymers, ethylene-vinyl acetates, ethylene-butyl acetates, and mixtures thereof; and
   wherein the cooled sealed package is non-tacky.

2. The method of forming an integral hot melt adhesive package of claim 1 wherein pumping or pouring the hot melt adhesive in a molten state is conducted at temperatures of about 150° C. or below.

3. The method of forming an integral hot melt adhesive package of claim 1 wherein the heat sink is water.

\* \* \* \* \*